Feb. 8, 1949.    H. M. STUELAND    2,461,093
SHOVEL LOADER
Filed May 16, 1946
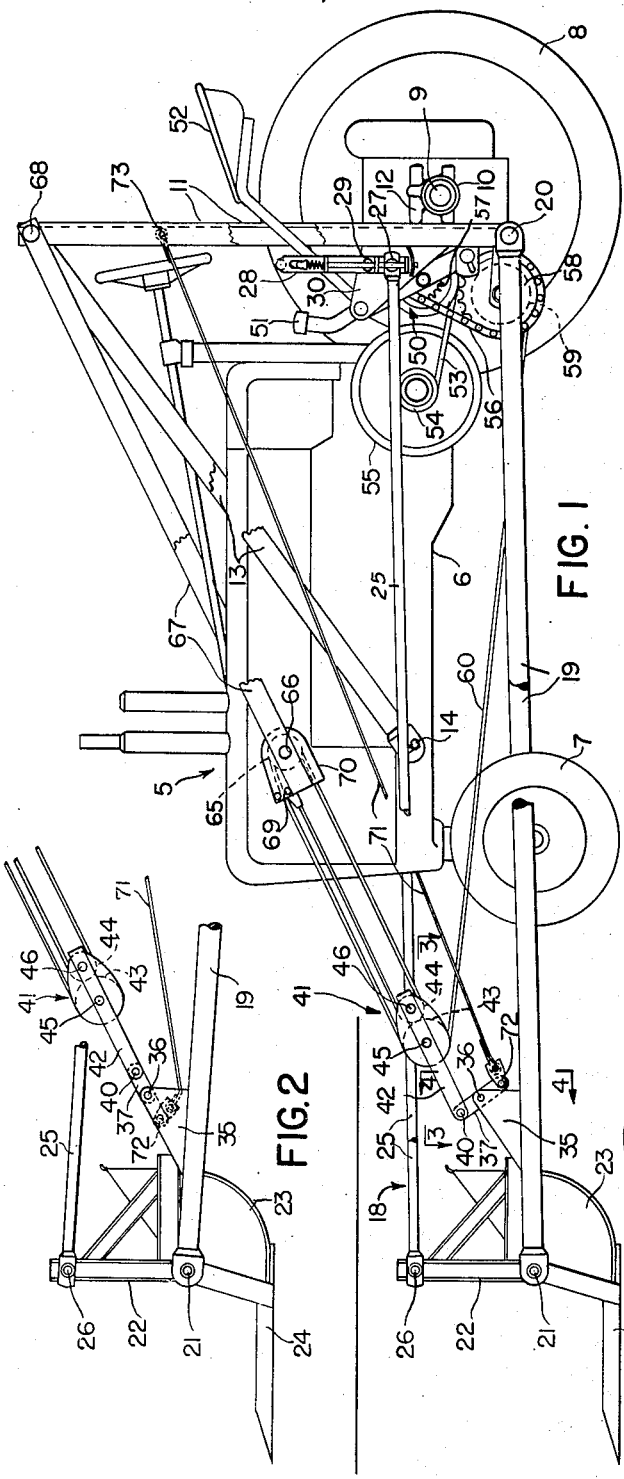
INVENTOR
HAROLD M STUELAND
BY
ATTORNEYS Patented Feb. 8, 1949

2,461,093

UNITED STATES PATENT OFFICE 2,461,093

SHOVEL LOADER

Harold M. Stueland, East Moline, Ill., assignor to Deere & Company, Moline, Ill., a corporation of Illinois Application May 16, 1946, Serial No. 670,259

7 Claims. (Cl. 214—140)

The present invention relates generally to loaders and more particularly to loaders of the type comprising a digging tool or bucket disposed in front of a tractor and mounted on a pair of laterally spaced longitudinally extending arms pivotally connected to the tractor at their rear ends and extending forwardly along opposite sides of the tractor body, respectively.

The principal object of the present invention relates to the provision of lifting means for raising the implement arms, which provides for an increased mechanical advantage when lifting a bucket load through that portion of the range of movement nearest the ground, which automatically changes to a direct action after the bucket is raised beyond a certain predetermined height.

Under certain operating conditions, such as, for example, when loading manure from a frozen pile in the barnyard into a manure spreader, it requires an appreciably greater force in breaking the material out of the frozen pile during the initial lifting movement, than is required to raise the bucket load to transport position after it has been broken out of the pile. According to the present invention, a given amount of force exerted by the hoisting mechanism is applied to the implement through means providing a mechanical advantage during the initial portion of the range of movement of the implement, thereby providing a slower lift against a greater resistance while the material is being broken out of the pile, and after the implement is raised to a predetermined height, the remaining portion of the range of movement is accomplished without the mechanical advantage, by applying the force of the hoisting mechanism directly, thereby obtaining a greater speed of lift against the lower resistance.

These and other objects and advantages of my invention will be apparent to those skilled in the art after a consideration of the following description, in which reference is had to the drawings appended hereto, in which Figure 1 is a side elevational view of a tractor mounted loader embodying the principles of my invention, the digging tool being shown in lowered ground engaging position, certain parts of the loader being broken away to expose other parts thereof;

Figure 2 is a fragmentary side elevational view showing the forward end of the implement in partially raised position;

Figure 3 is a top plan view, drawn to an enlarged scale, showing a portion of the lifting connection as viewed along a line 3—3 in Figure 1; and Figure 4 is a sectional elevational view taken along a line 4—4 in Figure 1 and drawn to an enlarged scale.

Referring now to the drawings, the tractor is indicated by reference numeral 5 and comprises a narrow fore and aft extending body 6 carried at its forward end on a dirigible wheeled truck 7 and at its rearward end on a pair of laterally spaced traction wheels 8, one of which has been removed in Figure 1 to expose the details of construction of the implement. The traction wheels 8 are carried on laterally extending axles 9 journaled within conventional axle housings 10, which extend laterally from opposite sides of the tractor body 6. A pair of vertically disposed masts 11 are rigidly secured to implement supporting bosses 12 disposed on the front sides of the tractor axle housings 10, respectively, and extend upwardly and downwardly therefrom. The upper ends of the masts 11 are braced by a pair of downwardly and forwardly and inwardly inclined bracing members 13, which are bolted at 14 to the sides of the body 6, respectively.

The implement is indicated by reference numeral 18, and includes a pair of laterally spaced longitudinally extending supporting arms 19, which are pivotally mounted on transversely aligned pivot pins 20 on the lower ends of the masts 11, respectively, and extend forwardly therefrom along opposite sides of the tractor body 6, respectively. The forward ends of the arms 19 are swingably connected by means of transversely aligned pivot pins 21 to a rigid carriage frame 22, which extends transversely across in front of the tractor 5 and carries a digging tool in the form of a bucket 23, which is swingably mounted on the pivot pins 21 for angular movement between carrying and dumping position. The bucket 23 is provided with forwardly extending fork teeth 24, which are sharpened at their forward ends to engage a load of material.

A pair of links 25, disposed above and substantially parallel to the arms 19, respectively, are pivotally connected at 26 at their forward ends to the upper portion of the carriage frame 22 and extend rearwardly along opposite sides of the tractor body 6, respectively, and are pivotally connected by bolts 27 to a pair of adjusting levers 28, which are swingably mounted on pivots 29 on a pair of brackets 30, which are rigidly fixed to the masts, respectively, and extend forwardly therefrom. The inclination of the bucket teeth 24 relative to the ground can be adjusted by swinging the lever 28 forwardly or rearwardly.

Thus far described, the loader is similar to that disclosed and claimed in my co-pending application, Serial No. 652,504, filed March 7, 1946, to which reference may be had for a more complete and detailed description of the implement. It is to be understood that the present invention is not limited to the use of this particular loader, and therefore since such details are not essentially a part of the present invention, they are not deemed necessary in this description.

Coming now to that part of the structure with which my present invention is more particularly concerned, each of the arms 19 is provided with a connecting plate 35, disposed in a fore and aft extending vertical plane and rigidly secured, as by welding, along the top of the associated arm 19. Inasmuch as the lifting connections to be described, connected to the two connecting plates 35, respectively, are substantially identical, a description of one connecting means will suffice for both. Each connecting plate 35 is generally triangular and carries a pivot pin 36 at its upper rear corner. A lever 37 is provided with a hub 38 which is journaled on the pivot pin 36, the hub 38 being disposed intermediate the two ends of the lever 37. The lever 37 is thus swingable about the transversely disposed pivot pin 36 for movement in a longitudinally extending vertical plane.

One end of the lever 37 is connected by means of a transverse pivot pin 40 to a lifting mechanism 41, which comprises a pair of juxtaposed straps 42, which extend upwardly and rearwardly from the pivot pin 40 and diverge to receive therebetween a pair of pulleys 43, 44, which are journaled on supporting shafts 45, 46 carried in the straps 42.

The loader arms 19 are raised and lowered by power transmitted through a clutch and brake assembly, indicated generally by reference numeral 50, which is mounted on the bracket plate 30 and is controlled by means of a foot pedal 51 disposed conveniently adjacent the tractor operator's seat 52. The details of the clutch and brake assembly 50 are not an essential part of the present invention, and are therefore omitted in the interest of simplicity, but reference may be had to my co-pending application, Serial No. 649,332, filed February 21, 1946, for a complete and detailed description thereof. The control clutch and brake assembly 50 receives power through a V-belt 53 from a pulley sheave 54 secured to the flywheel 55 of the tractor, and controls the raising and lowering of the arms 19 through a power transmitting chain 56, interconnecting a pair of sprockets 57, 58, which are mounted on the clutch and brake assembly 50 and on a pair of suitable winding drums 59, disposed alongside each of the arms 19, respectively, near their pivot supports 20.

Each of the winding drums 59 controls a cable 60, which extends forwardly from the drums 59 alongside of the supporting arms 19 and passes around the forward sheave or pulley 43 and extends upwardly and rearwardly therefrom, around an upper pulley 65 which is journaled on a shaft 66 carried on a link 67, which extends upwardly and rearwardly and is swingably connected by means of a pivot pin 68 to the upper end of the mast 11. The cable is trained around the sheave 65 and returns to the pulley 44, and is trained around the latter and has its end anchored on a bolt 69 to a casing 70 which encloses the pulley 65 on the end of the link 67. During operation, the foot pedal 51 is depressed to cause the winding drums 59 to wind up the cable 60, thereby pulling the sheaves 43 and 44 upwardly and rearwardly toward the upper sheave 65. This exerts a tensional force through the connecting straps 42 and pivot pin 40 on the upper end of the lever 37, thereby tending to swing the latter in a clockwise direction, as viewed in Figure 1, about the axis of the pivot pin 36. This tendency is balanced, however, by a connection to the tractor frame in the form of a flexible cable 71 which is swingably connected by means of a pivot bolt 72 to the lower end of the lever 37 and extends upwardly and rearwardly therefrom and is connected by a bolt 73 to the mast 11 at a point spaced upwardly from the pivot axis 20 of the implement arm 19, the bolt 73 also being spaced downwardly from the point of connection 68 of the link 57 which is part of the lifting mechanism 41.

During operation, when the bucket 23 is resting upon the ground, the lever 37 is substantially perpendicular to the direction of application of lifting force through the straps 42 and pivot 40. The pull through the lifting mechanism 41 against the upper end of the lever 37 is balanced by the tension in the flexible link 71, thereby transmitting the lifting force through the pivot 36 to the lifting plate 35, causing the arms 19 and bucket 23 to swing upwardly about the axis of the pivot mounting 20. As the implement swings upwardly, the flexible link 71 swings upwardly about the anchor bolt 73. Inasmuch as the flexible link 71 is moving in its lower quadrant of movement while the lifting plate 35 and arm 19 move in an upper quadrant of their swinging movement, the pivot pin 36 tends to move upwardly and rearwardly, while the connection 72 between the lower end of the lever 37 and the flexible link 71 tends to swing upwardly and forwardly, with the result that the lever 37 shifts angularly in a clockwise direction about the axis of the intermediate pivot 36 during the raising of the implement, until the lever 37 is disposed in the line of force of the lifting mechanism 41, as shown in Figure 2, thereby applying the tension force directly through the straps 42, the pivot 40 and the lever 37 to the connecting pin 36. Further raising of the implement results in a slackening of the flexible link 71, since the path of movement of the connecting pin 72 now follows an arc about the axis of pivotal movement 20 of the implement arm 19.

Hence it may be said that the lever 37 provides a three-way or differential connection between the lifting mechanism 41, the frame connected flexible link 71, and the implement arms 19, which provides a mechanical advantage between the lifting mechanism 41 and the implements arms 19 during the initial portion of the range of lifting movement. This is evident from the fact that the lifting mechanism connecting pin 40 moves upwardly and rearwardly at a greater rate of speed than that of the pivot connection 36 to the implement, so that the lifting force applied through the arms 19 to the bucket 23 is greater within the lower portion of the range for giving tensional pull through the pivot pin 40, than it is in the upper range of movement when the tensional force is applied directly through the lever 37 when the connecting pins 36, 40 are disposed in the line of force of the lifting mechanism, in the position shown in Figure 2.

Conversely, when the bucket is being lowered, assuming that the cable 60 is payed out at a constant speed, the implement lowers through its upper range of movement at a comparatively high rate of speed until the slack is taken out of the flexible cable link 71, and the lever 37 begins to move out in a counterclockwise direction. This will cause the downward vertical movement of the bucket to proceed at a comparatively lower rate of speed, by virtue of the increased mechanical advantage, which has a cushioning effect on the implement in case the operator allows the latter to drop to the ground without interruption.

I claim:
1. In combination, a mobile frame, a supporting arm swingably mounted on said frame by means providing for generally vertical movement relative thereto, lifting means, and a differential connecting means between said lifting means, said arm, and said frame, said connecting means comprising a member movably connected to each of said lifting means, arm and frame and so constructed and arranged that an application of lifting force through said lifting means to lift said arm through a first range of movement causes a movement of said lifting means relative to said arm and away from the latter and a relative movement of the connection between said connecting means and said frame toward said arm, thereby providing a mechanical advantage between said lifting means and said arm, and an application of said lifting force swinging said arm upwardly beyond a predetermined angle disables said connection to said frame, thereby connecting said lifting means directly with said arm.

2. In combination, a mobile frame, an arm swingably mounted on said frame by means providing for generally vertical movement relative thereto, lifting means, and a differential connecting means between said lifting means, said arm, and said frame, said connecting means comprising a lever pivotally mounted intermedaite its ends on said arm, a flexible member connecting one end of said lever with a point on said frame spaced from the axis of swinging movement of said arm, said lifting means being connected to the opposite end of said lever, said differential connecting means being so constructed and arranged that actuation of said lifting means effects rotation of said lever during upward swinging movement of said arm from a position in which a reaction to the lifting force is transmitted through said flexible member to a position in which the latter is slack and said lifting force is transmitted directly to said arm.

3. In combination with a tractor, arm means swingably mounted on said tractor for vertical swinging movement and extending forwardly therefrom, a digging tool mounted on the forward end of said arm means, lifting means, and connections between said lifting means and said arm means providing a mechanical advantage therebetween during an initial range of movement as said tool is lifted from ground engaging position, comprising a lever pivotally mounted on said arm means on a transverse axis, said lifting means being pivotally connected to said lever, and flexible link means pivotally connected to said lever in opposed relation to said lifting means, said link means being swingably connected to said frame on a transverse axis spaced above the axis of swinging movement of said arm means, whereby upward movement of said arm and link means under control of said lifting means effects an angular movement of said lever until the pivot axis of said lever and pivot connection between the latter and said lifting means lie in the line of force of said lifting means, after which further application of lifting force acts directly upon said arm means.

4. In a hoist, the combination of a frame, a load carrying element, a lifting element, and means connecting said lifting element to said load carrying element providing a mechanical advantage during a first portion of the range of lifting movement, said connecting means including a lever attached to said lifting element and having a connection with said frame and a fulcrum connected with said load carrying element, said connections being so constructed and arranged as to limit the extent of movement of said lever about said fulcrum to cause the lifting force to be transmitted directly to said load carrying element through said lever and its fulcrum during a second portion of the range of lifting movement.

5. In a hoist, the combination of a frame, a load carrying element, a lifting element, and means connecting said lifting element to said load carrying element providing a mechanical advantage during a first portion of the range of lifting movement, said connecting means including a lever pivotally mounted intermediate its ends on said load carrying element and connected at one end to said lifting element, a cable connecting the other end of said lever to said frame and adapted to slacken after the load carrying element has been raised to a certain extent, thereby permitting the lever to take a position along the line of force of said lifting element, thus transmitting said force directly to said load carrying element.

6. In a hoist, the combination of a frame, a load carrying element, a lifting element, and means connecting said lifting element to said load carrying element providing a mechanical advantage during a first portion of the range of lifting movement, said connecting means including an angularly movable member mounted on said load carrying element and connected to said lifting element and said frame in opposed relation whereby a force exerted by said lifting element reacts through said movable member upon said frame, said connecting means being so constructed and arranged to limit the extent of angular movement of said member, thereby effecting a direct connection between said lifting element and said load carrying element after said member has reached the end of its range of angular movement.

7. In a hoist, the combination of a frame, a load carrying element, a lifting element, and means connecting said lifting element to said load providing a mechanical advantage during a first portion of the range of lifting movement, said connecting means including a lever pivotally mounted intermediate its ends on said load carrying element and connected at one end to said lifting element, a cable connected between the other end of said lever and a point on said frame toward which the load carrying element moves when lifted, thereby causing said cable to slacken after the load has been lifted to a predetermined extent, thereby permitting said lever to take a position along the line of force of said lifting element, thus transmitting the lifting force directly to the load.

HAROLD M. STUELAND.

REFERENCES CITED

The following references are of record in the file of this patent:

UNITED STATES PATENTS

| Number | Name | Date |
| --- | --- | --- |
| 1,527,251 | Furst | Feb. 24, 1925 |
| 1,723,506 | Goodlin | Aug. 6, 1929 |
| 2,067,879 | Whitmire | Jan. 12, 1937 |
| 2,323,434 | Williams | July 6, 1943 |
| 2,383,686 | Ryan | Aug. 28, 1945 |
| 2,410,567 | Christiansen | Nov. 5, 1946 |
| 2,433,086 | Borgelt | Dec. 23, 1947 |